Nov. 14, 1961  R. LEDUC  3,008,455
SERVO-CONTROLS
Filed Feb. 18, 1959  6 Sheets-Sheet 1
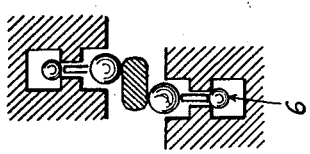
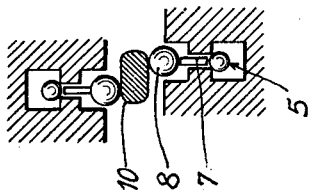
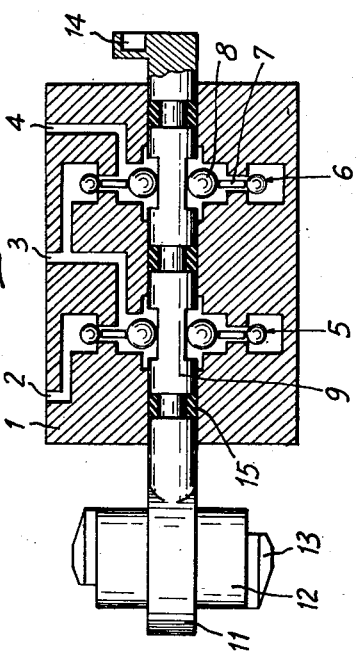
Inventor
Rene Leduc
by Michael S. Striker
Attorney

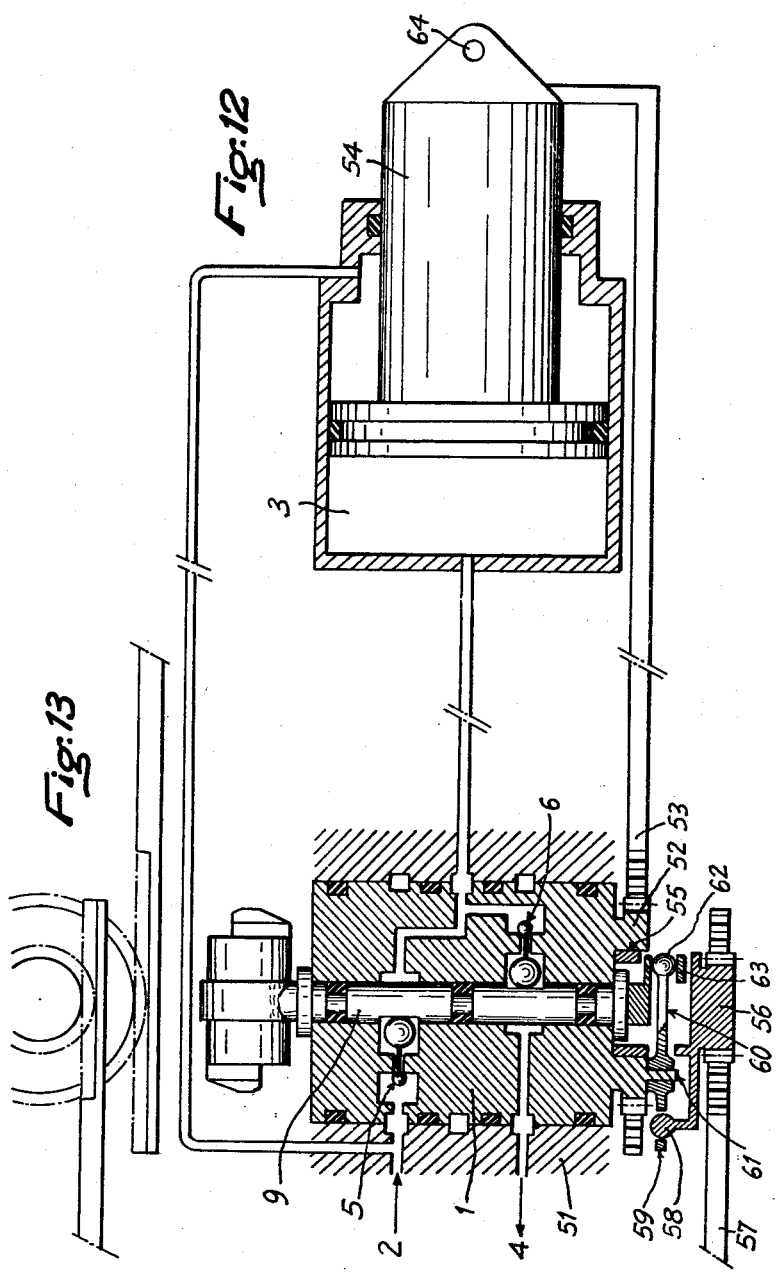

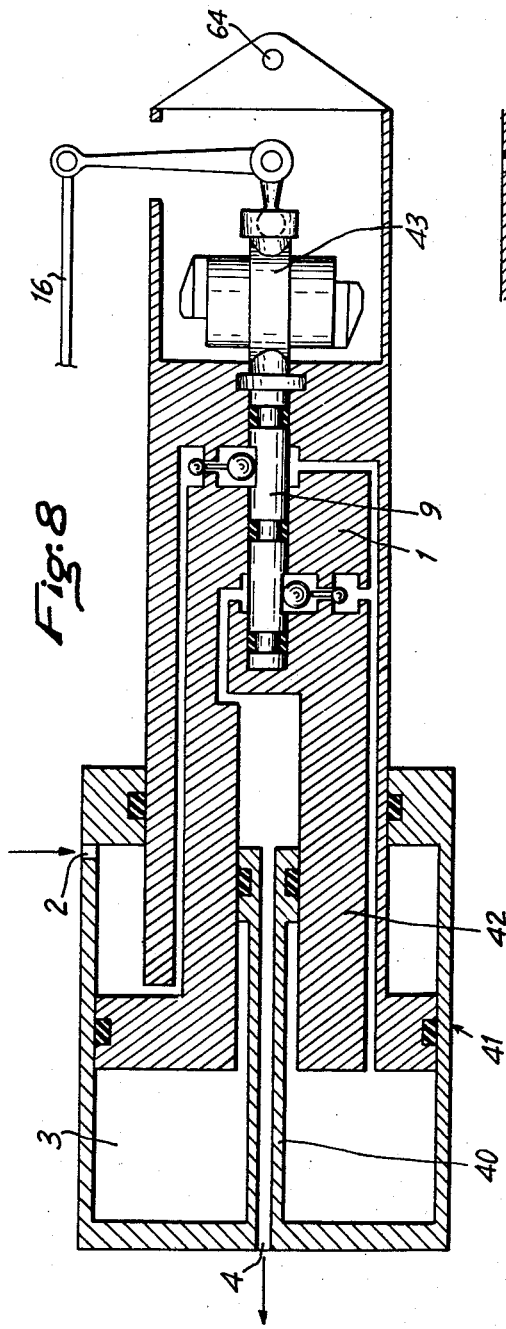
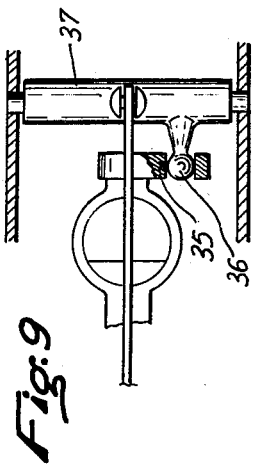

Nov. 14, 1961 R. LEDUC 3,008,455
SERVO-CONTROLS
Filed Feb. 18, 1959 6 Sheets-Sheet 4
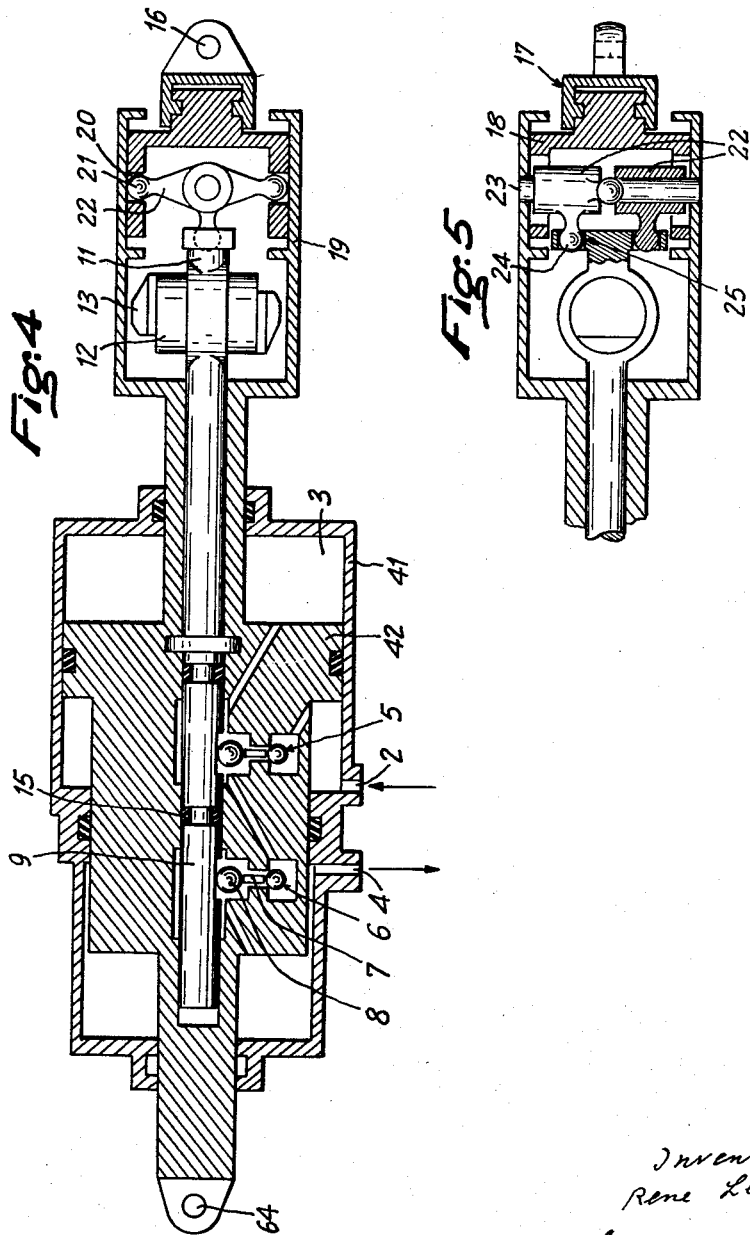
Inventor
Rene Leduc
by Michael S. Striker
Attorney Nov. 14, 1961 R. LEDUC 3,008,455
SERVO-CONTROLS
Filed Feb. 18, 1959 6 Sheets-Sheet 5
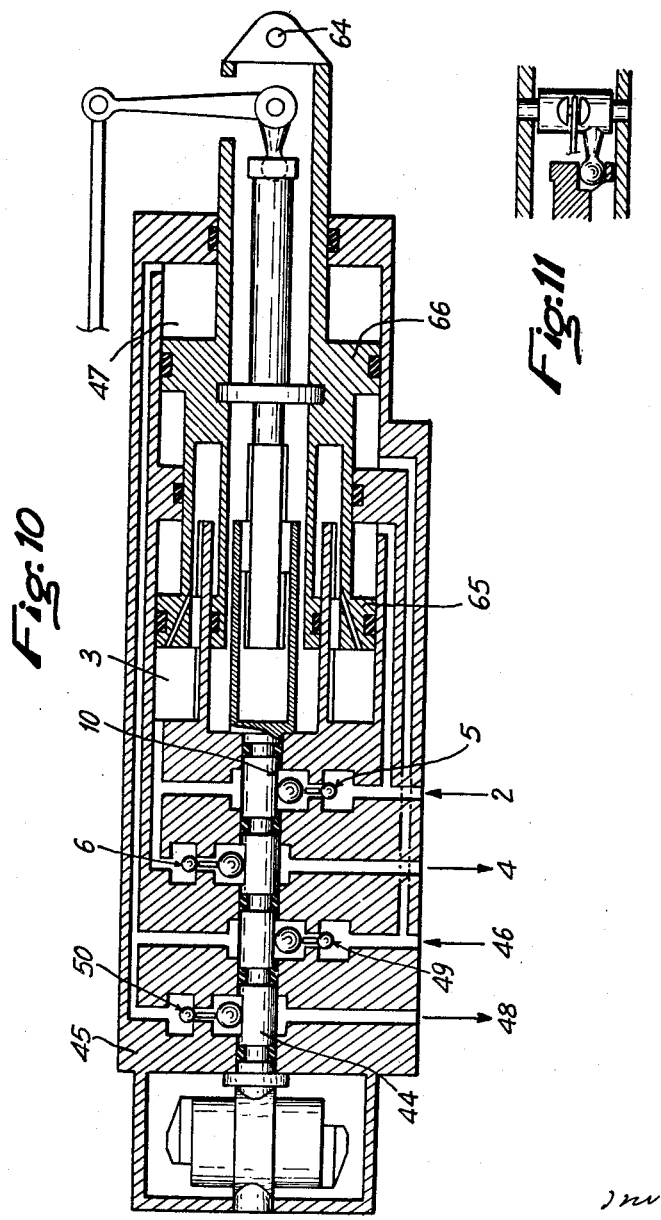
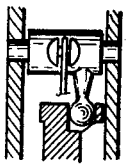

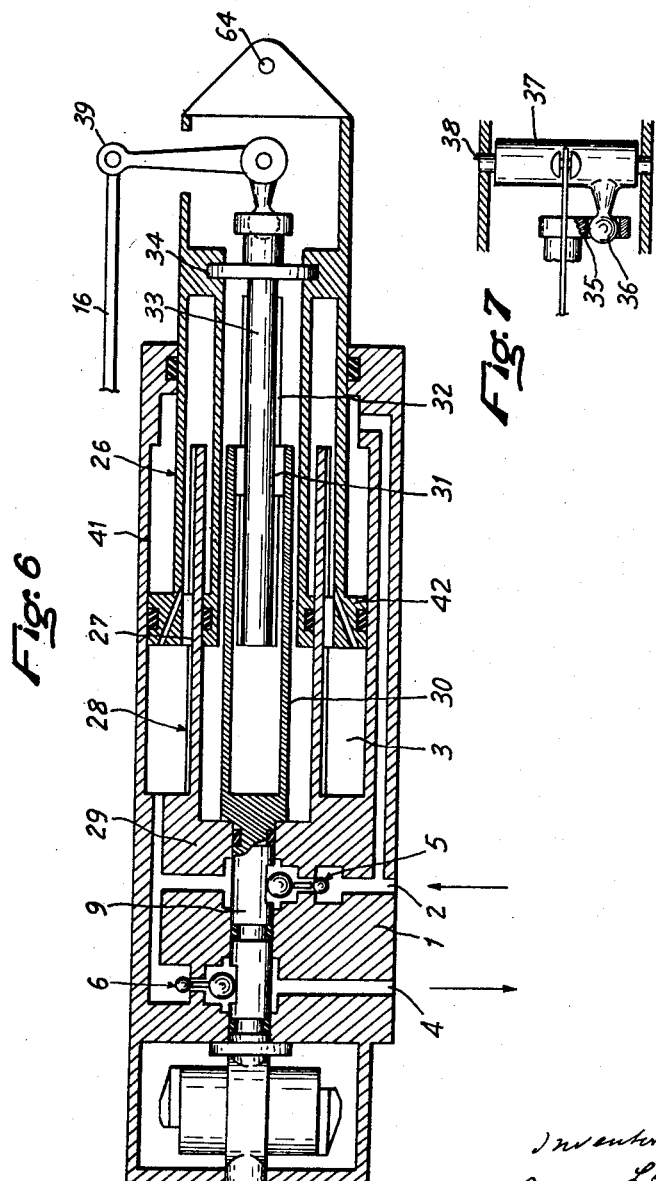

United States Patent Office 3,008,455
Patented Nov. 14, 1961

3,008,455
SERVO-CONTROLS
René Leduc, 23 Rue Henri Cloppet, Le Vesinet, France
Filed Feb. 18, 1959, Ser. No. 794,116
Claims priority, application France Feb. 19, 1958
14 Claims. (Cl. 121—41)

It is known that one of the chief problems presented in the construction of high quality servo controls is the achievement of a servo control in which the valve system has no appreciable leakage and the power needed to overcome friction resistances is very small to fulfill both these conditions at the same time was found to be very difficult.

The present invention has for its object an improved servo control in which this object is achieved.

The servo control according to this invention is composed of a control member acting upon a valve system interposed between a source of hydraulic pressure and the surfaces of a piston linked to the controlled member, such system being a valve box, preferably with ball valves, wherein the valves are controlled by cams mounted on a rotatable shaft which is longitudinally immovable with respect to the valve system, means being provided to convert the relative displacement of the control member with respect to the controlled member into relative proportional rotations of said cam-bearing shaft with respect to the valve unit.

The mechanical means for the conversion of longitudinal displacement into rotation may be of any known type, for example a projection co-operating with a socket recess in the shape of a helical groove or a crank lever co-operating with an arm supported by the rotatable shaft, or, if the cam-bearing rotary shaft is arranged perpendiculary to the longitudinal displacement direction of the control-member and the controlled member, the combination of a rack and a toothed wheel.

The invention envisages moreover all or part of the arrangements considered below, either by themselves or in any possible combination:

(1) A friction-eliminating device is provided which acts upon the cam-actuating shaft by imparting to it movements about its axis in both senses.

(2) The valve system follows the displacements of the controlled member and the rotary cam-bearing shaft extends parallel to these displacements while the means for converting the differential displacements between control member and controlled member into rotations of the cam-bearing shaft with respect to the valve system is mounted on a member which occupies a longitudinal position and is linked to the valve system.

Preferably the cam-bearing shaft is co-axial to the lifting-jack piston.

(3) The valve system is stationary, the rotary cam-bearing shaft lies parallel to the longitudinal displacement direction and the means converting the relative longitudinal displacements into rotations of the cam-bearing shaft with respect to the valve system, is mounted on a member which occupies a longitudinal position and is linked to the controlled member, said means driving an intermediate shaft whose rotation is transmitted, by any appropriate means, to the cam-bearing shaft.

(4) Said intermediate shaft is co-axial to the cam-bearing shaft and both are interconnected by means of a telescopic sleeve allowing their relative longitudinal displacement but preventing relative movement in the rotational sense, due to the co-operation of longitudinally extending keys and keyways.

(5) The valve system is stationary in a longitudinal sense and rotatable about the cam-bearing shaft which latter extends perpendicularly to the direction of displacement of the control member and the controlled member, said displacements being converted into rotations of the cam-bearing shaft and of the valve system, respectively, in such a way that the relative rotation of said shaft with respect to the valve system is a function of the relative displacement of the control member and the controlled member.

The invention is illustrated by the drawings annexed hereto on which there is shown, merely by way of example, in:

FIG. 1 a longitudinal section of a pilot operated lifting jack valve system according to the invention;

FIGS. 2 and 3 two fragmentary sectional views, respectively, of FIG. 1, transversely of the cam and valve assemblies;

FIG. 4 a longitudinal axial section of another embodiment of the device according to the invention;

FIG. 5 a fragmentary sectional view of the device of FIG. 4, in a plane perpendicular to the sectional plane of FIG. 4;

FIG. 6 an axial section of another embodiment of the device according to the invention;

FIG. 7 a longitudinal fragmentary section of the device of FIG. 6 in a perpendicular plane;

FIGS. 8 and 9 two sectional views, corresponding respectively to those of FIGS. 6 and 7, relating to another embodiment of the invention;

FIGS. 10 and 11 two sectional views, corresponding respectively to those of FIGS. 6 and 7 and relating to still another embodiment of the invention;

FIG. 12 a sectional view through the axial plane of a valve system and lifting jack, according to another embodiment of the invention; and FIG. 13 a diagrammatic end view of the valve system of FIG. 12.

With reference to the drawings, there is shown in FIGS. 1 to 3 a valve system 1 which is interposed between a pressure source connected at 2, on the one hand, and the surfaces of a piston of a lifting jack on the other hand. One of these surfaces is connected to the duct 3, while a return 4 to the tank is provided (these connections are known). The valve system 1 of the invention is a valve box whose valves 5 and 6 are preferably ball valves actuated by push rods 7 and balls 8 which are moved by means of cams 10 supported by a shaft 9 which is rotatably mounted in the valve system 1, but immovable in the longitudinal sense with respect to system 1.

According to the invention, any displacement of the control member with respect to the controlled member is converted by some suitable means, known per se, into a rotation of the shaft 9 with respect to the valve box 1, and thus into an actuation of the valves in the sense of tending to bring the control member and the controlled member into their initial positions relative to each other. The controlled member thus follows all movements of the control member.

According to the invention, the shaft 9 preferably carries a friction-eliminating device which imparts to it rotary movements, in both directions, of very low amplitude.

The advantages of these arrangements are, inter alia:

The passive friction resistances to be overcome are considerably reduced in comparison with conventional servo controls.

The elimination of friction is achieved, not as usual by the application of alternating forces to the transmission itself, but merely by oscillatory movements imparted to the rotary shaft of the valve system, this being easier to accomplish since the static forces of torsional friction are smaller than longitudinal static frictional forces.

The formation of the cams as well as the number and dimensioning of the valves make it possible to obtain easily any desired valve lift characteristics and to avoid instability of the jack in the vicinity of its dead center position.

According to the embodiment shown in FIGS. 4 and 5, the valve system 1 is integral with the piston 42 of the servo control 41; it is therefore movable longitudinally and its displacements are the same as the displacements of the controlled member 64. The shaft 9 is co-axial with the piston 42.

The pilot control is effected by means of the rod 16 which follows the shaft of the jack. The yoke 17 is axially connected to the slide 18 which slides in the piston 19. This slide 18 comprises two recesses 20 for ball heads 21 situated at the ends of levers 22 which are hinged on a pin 23 carried by the piston 19, the opposite end of these levers 22 being formed by ball heads 24 which rest in recesses 25, the latter being part of the support 11, which is an extension of the rod 9.

The relative displacements of the control member or pilot member 16 and the controlled member 64 are also the relative displacements of the yoke 17 and the piston 19 connected to the valve system 1 on which is mounted the assembly 18—25 which transforms the said relative displacements into rotations of the shaft 9.

If the rod 16 is pushed to the left, the levers 22, driven by the action which the slide 18 exerts on the ball heads 21, turn about the pin 23, one in the opposite sense to the other, and drive the rod 9 by means of the ball heads 24, causing the rotation of the rod 9 and thus lifting the valves 5. The wide section of the jack is connected to the pressure supply and the jack is displaced towards the left.

When rod 16 stops moving, the jack continues its displacement and by means of the pin 23 (the ball heads 21 being immobilised by the slide 18) drives the levers 22 which rotate the rod 9 and return it to its initial position, closing in this way the valves 5, whereupon the jack is stopped.

Upon displacement of the rod 16 to the right, the reverse operation takes place, from the hydraulic point of view. The valves 6 are opened connecting thereby the space 3 to the tank, and the jack moves to the right; if the actuation of the rod 16 is stopped the displacement of the jack continues slightly and, by means of the pin 23 and the action on the levers 22, returns the rod 9 to the neutral position; the valves 6 are closed and the jack stopped.

In the example of FIGS. 6 and 7, the valve system 1 is stationary and integral with the jack body 41; the shaft 9 is co-axial with the piston 42—26 of the jack, and parallel to the displacement direction of the controlled member 64. The means for conversion of the relative displacements between the control rod 16 and the member 64 is integral with the latter in the longitudinal sense and it rotates an intermediate shaft 33 whose rotation is transmitted to the shaft 9.

In the example shown here the piston assembly 26—42 of the jack 41 is prevented from rotation by keys 27 fixed to piston 42 and sliding respectively in grooves 28 of the part 29, the rod 9 having a tubular extension 30 which carries keys 31 sliding respectively in grooves 32 of shaft 33, the latter being axially movable with the piston 26 but capable of rotating in a bearing 34. This shaft 33 carries a radial extension formed with a ball receiving recess 35 in which a ball 36 forming the end of a lever 37 is lodged, said lever being turnable on a pin 38 carried by the piston 26. At the other end of said lever 37 a yoke 39 serves as a link with the pilot control 16.

The device operates as follows: if the yoke 39 is pushed to the right the lever 37 is turned and causes, by means of the ball 36, the rotation of the shaft 33 which latter drives the rod 9, opening the valves 5 or 6, depending upon the sense of rotation.

When the actuation of the yoke 39 is stopped, the movement of the jack continues and causes the system to be rotated in the opposite sense.

The operation is otherwise the same as in the assembly shown in FIG. 2.

The embodiment according to FIGS. 8 and 9 is the same as that in FIGS. 4 and 5. The valve assembly 1 is movable, and is integral and co-axial with the piston 42. In the FIGS. 4 and 5, the means converting the relative displacement of the members 16 and 64 was mounted in a member integral with the valve assembly 1 (itself integral with the piston). In the case of FIGS. 8 and 9, said means is mounted in a portion integral with the control member 16 which is itself integral with the valve assembly 1. The ball head 36 of the lever 37 rests in a recess 35 supported by the extension 43 of the rod 9.

The hydraulic and mechanical operation are identical to the operation of the assemblies of FIGS. 6 and 7.

The FIGS. 10 and 11 show a modification of the example of FIGS. 6 and 7, with a differential double jack.

The cam-bearing shaft 44 comprises four cams 10.

The body 45 of the differential double jack is separated into compartments 2, 3, 4 and 46, 47, 48. The compartment 2 is connected to a first hydraulic supply system; compartment 3 is connected for the operation of a first jack 65; compartment 4 communicates with the tank of a first hydraulic system; compartment 46 communicates with a second hydraulic supply system; compartment 47 provides for the operation of a second jack 66; compartment 48 is connected to the tank of a second hydraulic system. The valves 5 separate the compartments 2 and 3; the valves 6 separate the compartments 3 and 4; the valves 49 separate the compartments 46 and 47; the valves 50 separate the compartments 47 and 48. The hydraulic operation takes place in the folowing manner:

If the pilot control is pushed to the right, valves 5 and 50 are lifted, thus connecting the compartment 3 to the pressure supply and the compartment 47 to the tank whereby the jack is caused to move to the left.

If the pilot control is pushed to the left, the valves 6 and 49 are lifted thus connecting the compartment 47 with the pressure supply and the compartment 3 to the tank.

In the case of FIGS. 12 and 13, the valve system 1 is stationary in the longitudinal sense, but rotatable in a support 51 about the axis of shaft 9 which extends perpendicularly to the direction of the displacements of control member 57 and controlled member 54—64.

The displacements of the member 57 are converted by rack teeth into rotations of the pinion 56.

A ball head 58 of the pinion 56 rests in a recess 59 of the lever 60, the latter being turnable on a pin 61 integral with the block 1. Said lever 60 comprises a ball head 62 which rests in a recess 63 forming part of the rod 9.

The valve system 1 comprises itself a pinion 52 meshing with a rack 53 which is connected to the piston 54 and to the controlled member 64 the displacements of which latter are thus converted into rotations of the valve system 1.

This device operates as follows:

If the rack 57 is pushed to the right, the pinion 56 turns slightly and moves the lever 60 which causes the rod 9 to turn; the valves 5 are lifted, the jack moves to the right pushing the rack 53 which, by means of the pinion 52, causes the block 1 to rotate.

Upon stopping the actuation of the rack 57, the jack continues its movement over a small distance and, by means of the pin 61, causes the lever 60 to rotate which brings the rod 9 back to neutral. The jack stops.

Operation in the opposite sense connects the space 3 to the tank and the movement is reversed.

Still other modifications are feasible, without thereby departing from the scope of the present invention, the illustrations of which are merely intended to serve as examples.

What I claim is:

1. A servo control comprising, in combination, a control member; a controlled member adapted to follow said control member; hydraulic cylinder means and hydraulic piston means in said cylinder means, one of said hydraulic means being movable with respect to the other and being connected to said controlled member so that the latter moves with the movable hydraulic means; hydraulic circuit means communicating with said cylinder means for conveying hydraulic fluid to and from said cylinder means; valve means cooperating with said hydraulic circuit means for controlling the flow of hydraulic fluid therein; rotary cam shaft means cooperating with said valve means for actuating the latter, when said shaft means turns in one angular direction, for producing a hydraulic fluid flow in said hydraulic circuit means and said cylinder means which moves said movable means and said controlled member therewith in one linear direction and for actuating said valve means, when said shaft means turns in an opposite angular direction, for producing a hydraulic fluid flow in said hydraulic circuit means and cylinder means which moves said movable means and said controlled member therewith in an opposite linear direction; and transmission means operatively connected with said control member and said rotary cam shaft for turning the latter in said one angular direction when said control member is moved in said one linear direction and in said opposite angular direction when said control member is moved in said opposite linear direction, said transmission means, rotary shaft, and valve means all having an initial rest position and said movable means being moved by the hydraulic fluid after the control member stops moving for returning said transmission means, rotary shaft and valve means to their initial rest position and for locating said controlled member in the position it had initially with respect to said control member.

2. A servo control as recited in claim 1 and wherein said rotary cam shaft is axially stationary with respect to said valve means and hydraulic circuit means.

3. A servo control as recited in claim 1 and wherein said valve means includes ball valve members, stems respectively cooperating operatively with said ball valve members for displacing the same when said stems are moved, and transmission elements interposed between said cam shaft and stems, respectively, for moving the latter in response to angular movement of said cam shaft.

4. A servo control according to claim 3 and wherein said transmission elements are themselves ball members.

5. A servo control as recited in claim 1 and wherein the axis of said cam shaft extends parallel to said linear directions.

6. A servo control as recited in claim 1 and wherein said cam shaft extends perpendicularly to said linear directions.

7. A servo control as recited in claim 1 and wherein said cam shaft is coaxial with said hydraulic piston and cylinder means.

8. A servo control as recited in claim 1 and wherein said piston means is the movable means and is connected with said controlled member.

9. A servo control as recited in claim 8 and wherein said valve means, rotary cam shaft, and part of said hydraulic circuit means are fixedly carried by and move with said piston means.

10. A servo control as recited in claim 8 and wherein said valve means, rotary cam shaft, and hydraulic circuit means are fixed to and remain stationary with said cylinder means.

11. A servo control as recited in claim 10 and wherein said transmission means includes a second shaft coaxial with said cam shaft and means connecting said shafts to each other for rotary movement together while freeing said second shaft for axial movement with respect to said cam shaft.

12. A servo control as recited in claim 1 and wherein said movable hydraulic means and said controlled member form a unitary structure, said transmission means including at least one bell crank pivotally carried by said unitary structure and having one arm pivotally connected with said control member, said transmission means including an extension extending radially with respect to said cam shaft and operatively connected thereto for turning the same when said extension turns, and the other arm of said bell crank cooperating with said extension for turning the latter and said cam shaft in one of said angular directions when said control member is moved and for turning said extension and cam shaft in the other of said angular directions when said unitary structure moves after said control member stops moving.

13. In a servo control, in combination, a valve body formed with fluid passages; a plurality of valves cooperating with said passages for closing and opening the same, each of said valves including a ball valve member and a stem cooperating therewith for displacing the same; a rotary cam shaft turnably carried by said body; and a plurality of additional ball members respectively interposed directly between and engaging said stems and cam shaft for transmitting movement of said shaft to said stems, whereby a rolling contact of low friction is provided between said cam shaft and additional ball members.

14. In a servo control as recited in claim 13, the axis of said cam shaft being laterally displaced from the axes of said stems, respectively, so that the latter axes do not intersect the axis of said cam shaft, whereby the latter operates with a predetermined lever arm on said additional ball members.

References Cited in the file of this patent
UNITED STATES PATENTS

| 2,343,912 | Lauck | Mar. 14, 1944 |
| 2,574,335 | Leduc | Nov. 6, 1951 |
| 2,711,158 | Leduc | June 21, 1955 |
| 2,969,044 | Leduc | Jan. 24, 1961 |

FOREIGN PATENTS

| 445,559 | Great Britain | Apr. 14, 1936 |

UNITED STATES PATENT OFFICE
CERTIFICATE OF CORRECTION

Patent No. 3,008,455            November 14, 1961

René Leduc

It is hereby certified that error appears in the above numbered patent requiring correction and that the said Letters Patent should read as corrected below.

In the heading to the printed spedification, line 5, for "Feb. 19, 1958" read -- Feb. 20, 1958 --.

Signed and sealed this 8th day of May 1962.

(SEAL)
Attest:

ERNEST W. SWIDER
Attesting Officer

DAVID L. LADD
Commissioner of Patents